Aug. 15, 1950 — M. R. LOREE — 2,518,915
FISH STRINGER
Filed April 28, 1947
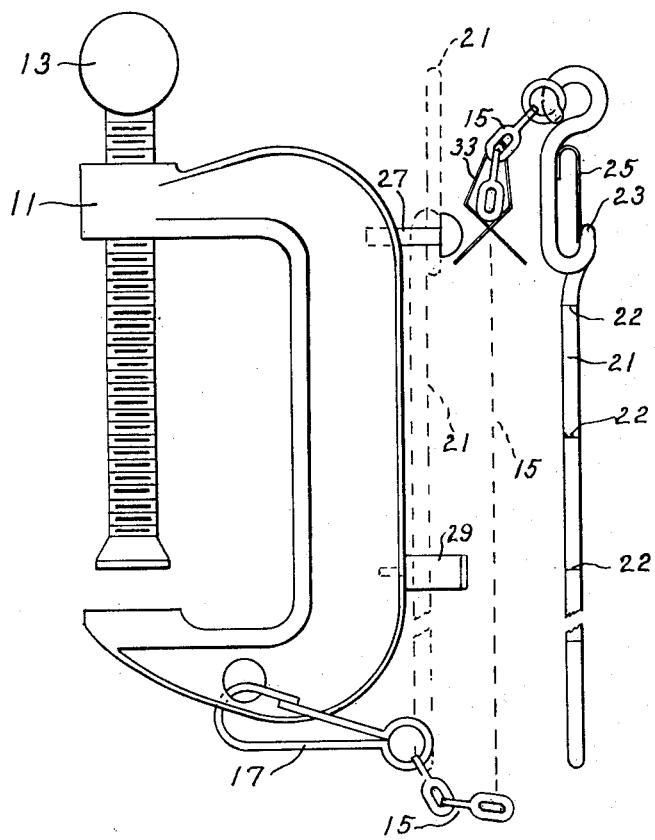
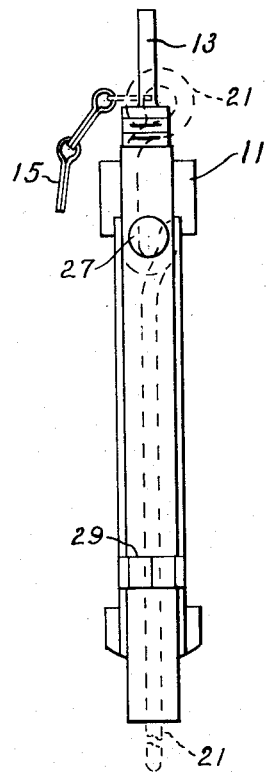
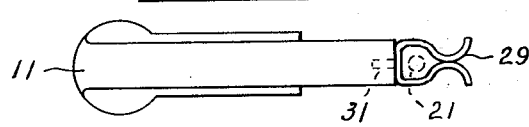
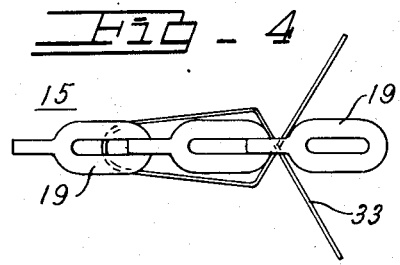
INVENTOR
MINTON R. LOREE
BY F. D. Hicks
ATTORNEY Patented Aug. 15, 1950

2,518,915

UNITED STATES PATENT OFFICE 2,518,915

FISH STRINGER

Minton R. Loree, Mount Morris, Mich.

Application April 28, 1947, Serial No. 744,313

7 Claims. (Cl. 224—7)

The invention pertains to fish-stringers for safely holding fish over the side of the boat and trailing them in the water.

It is an object of my invention to provide an improved fish-stringer which is convenient to install and use and which safely secures the captured fish and trails them in the water.

It is also an object of my invention to provide a fish-stringer having improved retaining means for more conveniently receiving and for more safely holding captured fish.

It is a further object of my invention to provide a fish-stringer comprising snap locking means in combination with resilient holding means for receiving and securing the needle after it has been threaded through the gills of the captured fish.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a side elevational view showing my improved fish-stringer, with the needle removed for use and dotted lines showing its secured position on the clamp;

Fig. 2 is a back edge elevational view of the clamp with the dotted lines showing the needle mounted thereon;

Fig. 3 is a bottom view; and

Fig. 4 is an enlarged view showing a fragment of the chain with the fish retainer thereon.

Referring more specifically to the figures of the drawing, it will be seen that my improved fish-stringer comprises clamp means 11 for attachment to a boat. For example, this clamp means may consist of a conventional C-clamp of a size and shape suitable to be installed over the gunwale of a boat (not shown) and whereupon it may be conveniently and quickly secured, by turning the thumb screw 13, in a well known manner. For holding fish strung thereon, a flexible member 15 is provided having one end positively but releasably secured to the clamp, as by a snap 17, or in any suitable manner. This flexible member 15 may be a chain having a plurality of interconnected links 19, and a fish threading needle 21 is secured to the other end for stringing fish thereon, in a manner which will be readily understood by fishermen.

This needle 21 is preferably an elongated metallic member, and it may be conveniently made of a piece of heavy wire. One end of this needle member is deformed suitably to form the open frame 23 of a snap fastener. A flat spring 25 is secured at one end for closing the open side of this frame 23, by the other end extending across the opening and being inwardly depressible, as shown. The needle 21 is provided with calibration marks 22 representing units of length such as inches, or any other desired units may be utilized, so that the length of a captured fish may be conveniently ascertained.

Projecting from the clamp is a headed pin or screw 27, and after stringing fish upon the flexible member 15, the snap fastener 25 of the needle may be quickly and conveniently snapped and locked thereon, as represented by the dotted lines in Figs. 1 and 2. Also the lower portion of the needle may be at the same time pressed into a yieldable resilient clip 29 which is secured on the clamp spaced from the headed pin. The clip 29 may be made of spring steel of a somewhat U-shape having inturned contacting portions with outwardly flaring ends, and it is secured on the back of the clamp, as by a screw or pin 31. Such locking and holding means firmly and safely holds the needle 21 in an arrangement which is convenient for measuring the fish with both hands free and the needle is quickly releasable when it is desired to string more fish thereon.

As a further precaution to prevent the loss of fish, if the needle might be accidently dropped into the water, I provide a fish retainer 33 which may be formed of a short piece of steel wire or other resilient material, looped around through one link of the chain with the ends passing through another link and projecting toward opposite sides of the chain, as shown more clearly in Fig. 4. As fish are strung upon the chain, the ends of the retainer 33 yield and permit the fish to be freely threaded upon the flexible member 15. The fish are easily removed from the other end of the chain by merely taking the snap 17 out of the clamp 11 without removing the clamp from the boat, post or other support. When removed, the clamp 11 serves as a handle for carrying the fish.

Although the chain shown is of the well known type having links stamped double out of sheet metal and folded over in inter-looped relation, it will be understood that other types of chain, or even a cord of woven threads or plastic, may be utilized and that the fish retainer wire 33 may be similarly installed around adjacent links or through the woven members.

It will be seen that I have provided a fish stringer which is easy and convenient to use and which is safe from loss while presenting a measuring scale for convenient use with both hands free. The improved fish stringer is easy and convenient to attach to a post, boat, or other structure and there is no fumbling around looking for a measuring stick or untying knots.

It is apparent that within the scope of my invention modifications and different arrangements may be made other than herein disclosed, and the present disclosure is illustrative merely, the invention comprehending variations thereof.

What is claimed as the invention is:

1. In a fish-stringer the combination of, clamp means suitable for attachment mounting, a flexible member having one end secured to said clamp means, a needle attached to the other end of said flexible member for stringing fish thereon, resilient snap lock means cooperatively disposed on said clamp means and on said needle for releasably locking said needle to said clamp means to hold fish strung upon a closed loop of said flexible member, and resilient holding means on said clamp means spaced from said lock means for yieldingly receiving and holding said needle.

2. In combination in a fish-stringer, a clamp of a suitable size and shape for clamping attachment mounting, a flexible member having one end releasably attached to said clamp, a needle attached to the other end of said flexible member for stringing fish thereon, a headed pin projecting from said clamp, a resilient snap on one end of said needle for releasably locking on said pin, and yieldable holding means on said clamp in spaced relation from said pin for receiving and holding said needle.

3. A fish-stringer in accordance with claim 2 and further characterized by said flexible member being a chain having interconnecting links, and a resilient fish retainer on said chain for retaining fish which have been strung thereon from accidental release therefrom.

4. A fish-stringer in accordance with claim 3 and further characterized by said fish retainer being a piece of resilient wire looped through adjacent links of the chain with its ends returning through the chain and projecting resiliently toward opposite sides of the chain.

5. A fish-stringer in accordance with claim 4 and further characterized by said needle having units of length calibrated thereon.

6. A fish-stringer comprising, a clamp suitable for attachment mounting, a flexible member having one end secured to said clamp, a needle attached to the other end of said flexible member for stringing fish thereon, a headed pin projecting from said clamp, said needle having an offset portion adjacent an end thereof and a flat spring secured to the needle adjacent said offset portion and providing therewith a frame, so that the needle may be conveniently snapped upon or removed from the headed pin on said clamp.

7. A fish-stringer needle comprising, a needle having an offset portion adjacent an end thereof and a flat spring secured to the needle adjacent said offset portion and providing therewith a frame.

MINTON R. LOREE.

REFERENCES CITED

The following references are of record in the file of this patent:

UNITED STATES PATENTS

| Number | Name | Date |
| --- | --- | --- |
| 389,598 | Roberts | Sept. 18, 1888 |
| 849,410 | Mills | Apr. 9, 1907 |
| 1,500,613 | Halloway | July 8, 1924 |
| 2,441,450 | Snegieski | May 11, 1948 |